(12) United States Patent
Brown

(10) Patent No.: US 7,774,107 B2
(45) Date of Patent: Aug. 10, 2010

(54) SYSTEM AND METHOD FOR SIMULATION OF CONDITIONS ALONG ROUTE

(75) Inventor: Ross Brown, Portland, OR (US)

(73) Assignee: The Boeing Company, Chicago, IL (US)

( * ) Notice: Subject to any disclaimer, the term of this patent is extended or adjusted under 35 U.S.C. 154(b) by 792 days.

(21) Appl. No.: 11/668,327

(22) Filed: Jan. 29, 2007

(65) Prior Publication Data

US 2008/0183346 A1 Jul. 31, 2008

(51) Int. Cl.
G01C 21/34 (2006.01)
G05D 1/00 (2006.01)
G06F 3/00 (2006.01)
(52) U.S. Cl. .................. 701/21; 701/117; 701/211
(58) Field of Classification Search ............... 701/21, 701/209, 207, 211, 117; 703/6; 715/700
See application file for complete search history.

(56) References Cited

U.S. PATENT DOCUMENTS

| | | | |
|---|---|---|---|
| 6,865,480 B2* | 3/2005 | Wong | 701/210 |
| 7,248,159 B2* | 7/2007 | Smith | 340/539.13 |
| 7,519,922 B2* | 4/2009 | Obradovich | 715/833 |
| 2002/0128774 A1* | 9/2002 | Takezaki et al. | 701/211 |
| 2005/0107944 A1* | 5/2005 | Hovestadt et al. | 701/200 |
| 2007/0118279 A1* | 5/2007 | Kudo | 701/208 |
| 2008/0033640 A1* | 2/2008 | Amano | 701/209 |
| 2008/0051997 A1* | 2/2008 | Rosenberg | 701/211 |

OTHER PUBLICATIONS http://carefile.com/WorldClock/home.html, Mar. 18, 2007, pp. 1-3.
http://www.qlock.com/time, May 3, 2007, p. 1.

* cited by examiner

*Primary Examiner*—Tan Q Nguyen
(74) *Attorney, Agent, or Firm*—Harness, Dickey & Pierce, P.L.C.

(57) ABSTRACT

A system for simulating conditions along a route traveled by a mobile platform (such as a train, marine vessel, aircraft or automobile) is provided. The system includes a source of user input. The system also includes a navigation control module that generates navigation data. The navigation data includes a route for the mobile platform based upon at least the user input. The system further includes a conditions control module that determines at least one condition associated with the route. The at least one condition includes at least a lighting condition associated with the travel of the mobile platform along the route.

19 Claims, 5 Drawing Sheets

SYSTEM AND METHOD FOR SIMULATION OF CONDITIONS ALONG ROUTE

FIELD

The present disclosure relates generally to route displays for use with guiding mobile platforms, and more particularly to a system and method for the simulation of conditions along a route.

BACKGROUND

The statements in this section merely provide background information related to the present disclosure and may not constitute prior art.

Many mobile platforms (such as trains, ships, aircraft and automobiles) employ route planning software to guide the mobile platform from an origin to a destination. For example, electronic route planning software can be used by marine vessels to plot a route from an origin to a destination. Generally, the route planning software employed to navigate marine vessels illustrate merely the route. Thus, the route planning software will typically contain a geographic region to navigate through, but not the possible conditions encountered along that route.

During voyages of large vessels, for instance oil tankers or container ships, conditions vary over time. Since some of these trips take ten days or more to complete, the variations can be significant. Strong weather systems may occur along the route, challenging navigational situations may arise, and eventually, landfall may need to be made in sometimes hazardous or otherwise challenging areas. In addition to the obvious points of interest, such as the departure and arrival of the vessel, other not so obvious navigation situations may arise. For example, when navigating in shallow water around coral, safe navigation can sometimes only be performed when the sun is high overhead, typically between 10 a.m. and 2 p.m. local time. During these hours, the coral is clearly visible. During other daylight hours the increased reflection of the sunlight off of the water makes the coral invisible.

Accordingly, it would be desirable to provide a system and method for the simulation of conditions along a route that would provide a navigator with a detailed display of conditions that may be encountered along the route, such as the lighting conditions.

SUMMARY

A system for simulating conditions along a route traveled by a mobile platform is provided. The system includes a source of user input. The system also includes a navigation control module that generates navigation data. The navigation data includes a route for the mobile platform based upon at least the user input. The system further includes a conditions control module that determines at least one condition associated with the route. The at least one condition includes at least a lighting condition associated with the travel of the mobile platform along the route.

In one implementation, a method of controlling a display of route conditions to assist in the navigation of a mobile platform is provided. The method includes receiving at least one user input that provides at least a destination for the mobile platform. The method also includes computing a route for the mobile platform based on a location of the mobile platform and the destination. Further, the method includes computing at least one condition along the route. The condition includes at least one lighting condition along the route. The method includes generating a display that displays the route, the location of the mobile platform and the at least one lighting condition along the route.

The present teachings also involve a marine vessel comprising a pilot house and a display located within the pilot house. The display is controlled by a route conditions control system. The route conditions control system includes a graphical user interface (GUI) manager module that populates a graphical user interface (GUI) and that receives the user input and a navigation control module that generates navigation data that includes a route for the marine vessel based upon at least the user input. The route conditions control system also includes a conditions control module that determines at least one condition associated with the route. The at least one condition includes at least a lighting condition associated with the travel of the marine vessel along the route. The GUI displays the route and the at least one condition associated with the route.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the present disclosure, application, or uses. Although the following description is related generally to the simulation of conditions along a route for a mobile platform, such as a marine vessel, it will be understood that the route condition system, as described and claimed herein, is applicable to any type of mobile platform (such as an aircraft, ship, spacecraft, train or land-based motor vehicle). Further, the system and method described herein can be implemented in various other applications besides route condition planning. Therefore, it will be understood that the following discussion is not intended to limit the scope of the appended claims to only marine vessels or to route condition planning applications.

Figure 1:
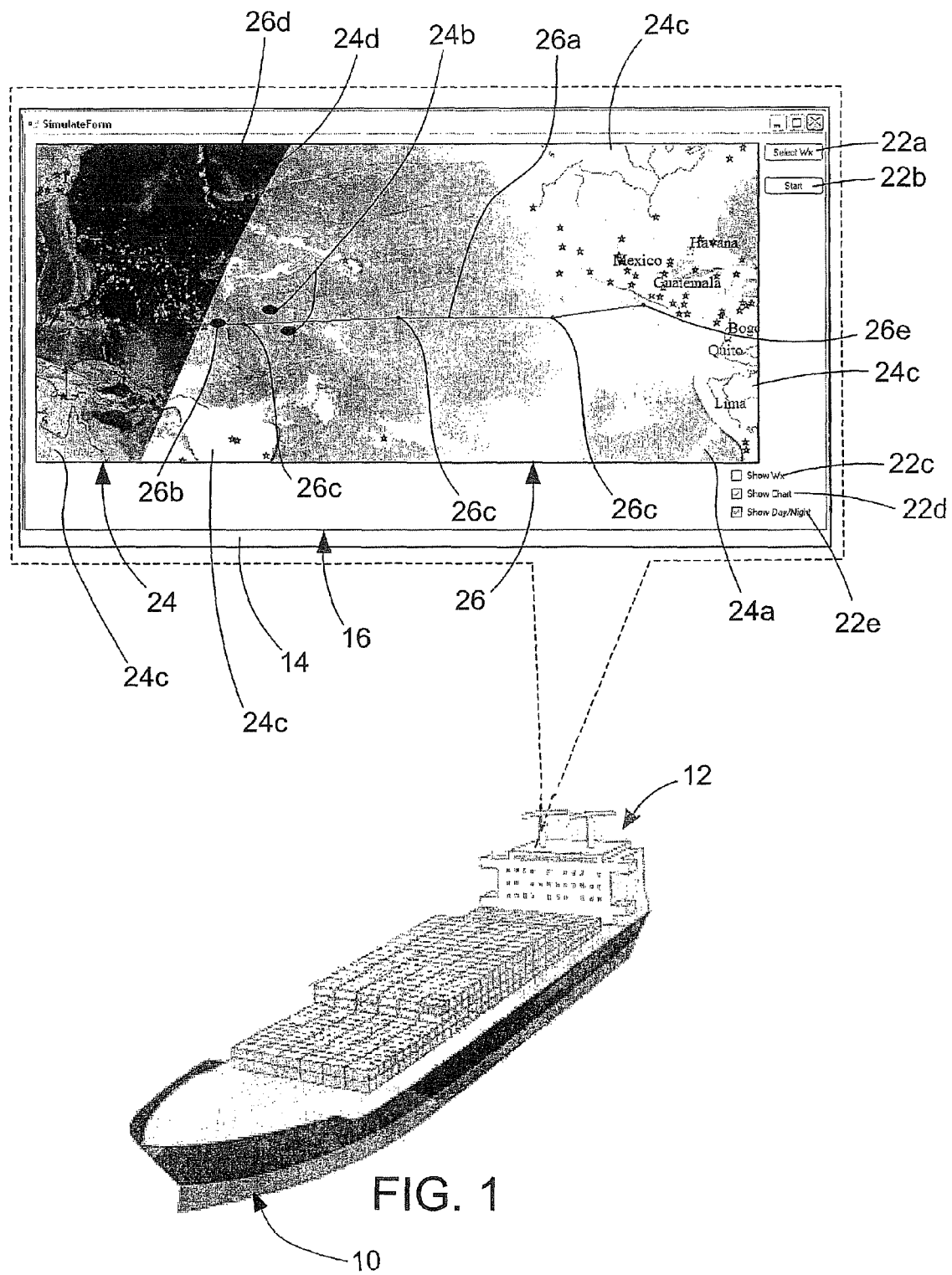
FIG. 1 is a schematic view of a mobile platform incorporating the simulation of conditions along a route according to the principles of the present disclosure.
Figure 2:
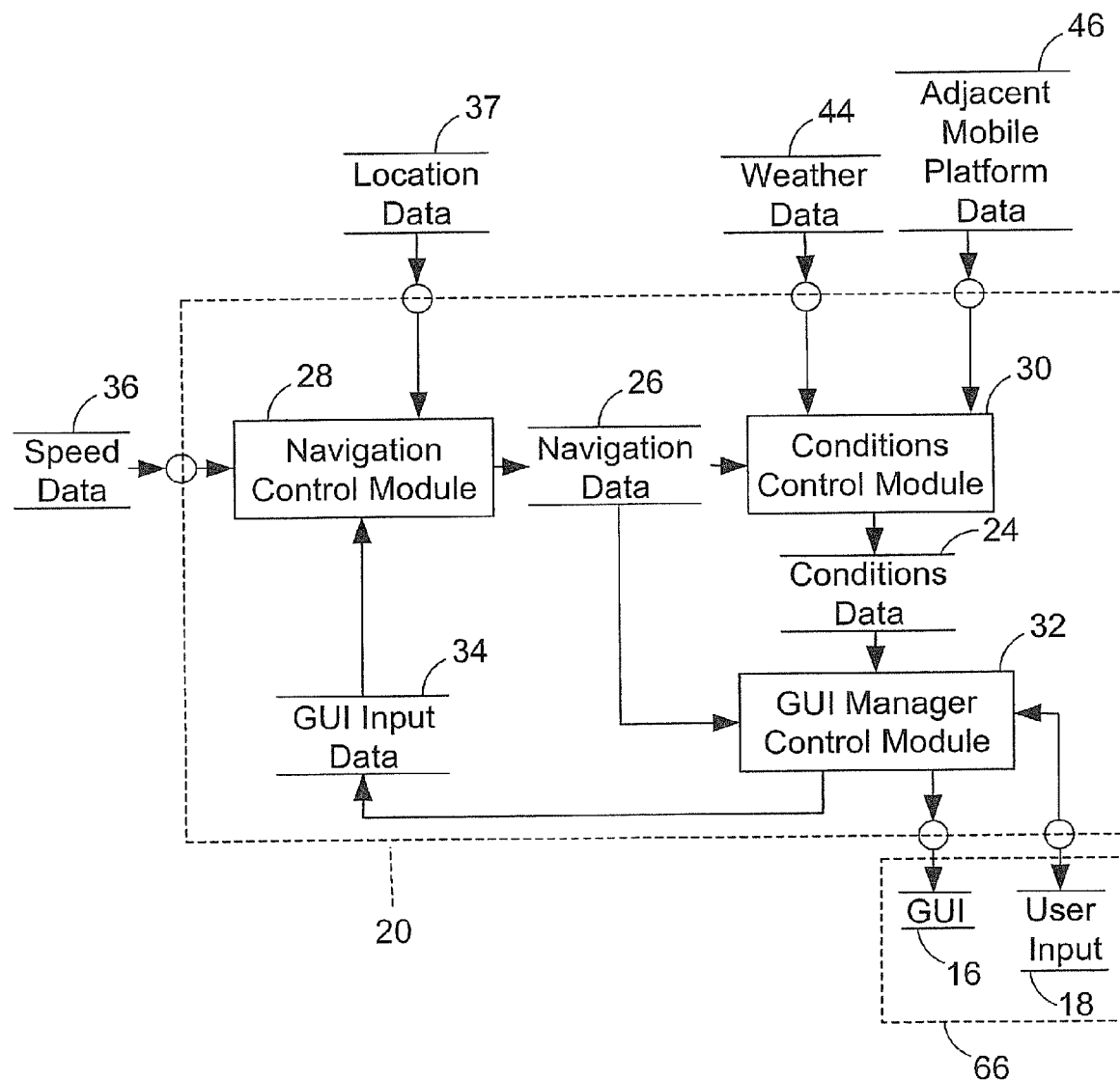
FIG. 2 is a dataflow diagram illustrating an exemplary route condition system of the present disclosure.

With reference to FIG. 1, a marine vessel 10 is shown. The vessel 10 includes a pilot house 12. The pilot house 12 includes a display system 14. The display system 14 includes a graphical user interface (GUI) 16 that is populated by a route conditions control module 20, as is illustrated in FIG. 2. It will be understood, that although the display system 14 is shown as being mounted within the pilot house 12, the display system 14 could be a portable system, such as a hand-held display. With reference back to FIG. 1, it will be understood, that although the display system 14 will be described as having one GUI 16, the display system 14 could have a plurality of GUIs that are associated with the display system 14, or a variety of other control modules associated with the vessel 10.

With additional reference to FIG. 2, the GUI 16 receives a user input 18 through a user input device (not specifically shown). The user input device may comprise a touch screen, a touch pen, a keyboard, a joystick, a mouse or any other suitable user input device. With reference back to FIG. 1, the GUI 16 displays conditions data 24 and navigation data 26, as will be discussed in greater detail herein. The GUI 16 includes a plurality of selectors 22. The selectors 22 enable the receipt of the user input 18. The selectors 22 include a select weather selector 22a, a start selector 22b, a show winds selector 22c, a show chart selector 22d, and a show day/night selector 28e. It will be understood, however, that any number of selectors 22 could be employed to display a variety of information for the user, such as a timeline for travel (not shown).

The select weather selector 22a, when selected, populates a weather GUI (not shown) that enables the user to view the weather along the route. The start selector 22b, when selected, activates the route conditions control module 20 to begin the simulation (i.e., superimposing) of the conditions along the route, and to generate the conditions data 24 and the navigation data 26, as will be discussed. The show winds selector 22c enables the user to specify if a winds GUI (not shown) should be displayed on the GUI 16. The winds GUI may display the weather along the route as wind arrows that indicate the direction and strength of the wind along the route. The winds GUI may be displayed adjacent to or overlaid onto the navigation data 26 to enable the user to view the navigation data 26 associated with a particular week or day. The show chart selector 22d, when selected, outputs the navigation data 26 to the GUI 16. The show day/night selector 22e enables the user to display the light conditions (i.e. dusk, night, dawn, day) on the GUI 16, as will be discussed herein. In addition, a routes GUI (not shown) may be displayed to enable the user to select a route from a list of stored routes.

With reference to FIG. 2, the route conditions control module 20 for the GUI 16 is shown in accordance with the teachings of the present disclosure. As used herein, the term "module" refers to an application specific integrated circuit (ASIC), an electronic circuit, a processor (shared, dedicated, or group) and memory that executes one or more software or firmware programs, to a combinational logic circuit, and/or to other suitable components that provide the described functionality. In FIG. 2, a dataflow diagram illustrates various components of a route condition system that is embedded within the route conditions control module 20. Various embodiments of the route conditions control module 20 may include any number of sub-modules embedded within the route conditions control module 20. The sub-modules shown in FIG. 2 may be combined and/or further partitioned to similarly control the display of the conditions data 24 and the navigation data 26. Inputs to the route conditions control module 20 are received from other control modules (not shown) within the vessel 10, and/or determined by other sub-modules (not shown) within the route conditions control module 20 (not shown). In FIG. 2, the route conditions control module 20 includes a navigation control module 28, a conditions control module 30 and a GUI manager control module 32.

The navigation control module 28 receives as input GUI input data 34, and optionally, speed data 36 and location data 37. The GUI input data 34 comprises the at least one of the origin and destination of the vessel 10 from the user input 18. The GUI input data 34 may also include the velocity or speed of the vessel 10 in knots. Optionally, the navigation control module 28 may receive the speed of the vessel 10 as speed data 36 from an external system or device, such as another control module, a vessel speed sensor or an optimization algorithm that sets the vessel speed to maintain a desired time of arrival given the expected weather conditions (not shown). The navigation control module 28 may also receive as input current position or location data 37 of the mobile platform, which may be received from another module or system, such as a global positioning system (not shown). Based on the GUI input data 34, the speed data 36 and the location data 37, the navigation control module 28 can generate navigation data 26. The navigation data 26 comprises a route for the vessel 10 from the origin to the destination, the current location of the vessel 10 along the route and may include a timeline to arrive at particular points along the route. It should be understood that the timeline may be provided as user input 18, or could be computed by the navigation control module 28 given the route and the speed data 36.

With reference now to FIG. 1, the navigation data 26 may comprise a route 26a, an icon 26b, a waypoint icon 26c, an origin icon 26d, a destination icon 26e and combinations thereof, for example. The display system 14 generates an aerial, overhead view of the route 26a. The route 26a may comprise a line, and if multiple routes 26a are displayed, may comprise a color and/or a name of the route 26a. The icon 26b may comprise a visual indicator of the exact location of the vessel 10 at that instant of time, as updated by the route conditions control module 20. The waypoint icon 26c may comprise a visual indicator on the route 26a of one or more waypoints along the route 26a. The origin icon 26d provides a visual indicator of the origin of the vessel 10, while the destination icon 26e provides a visual indicator of the destination of the vessel 10.

Figure 3:
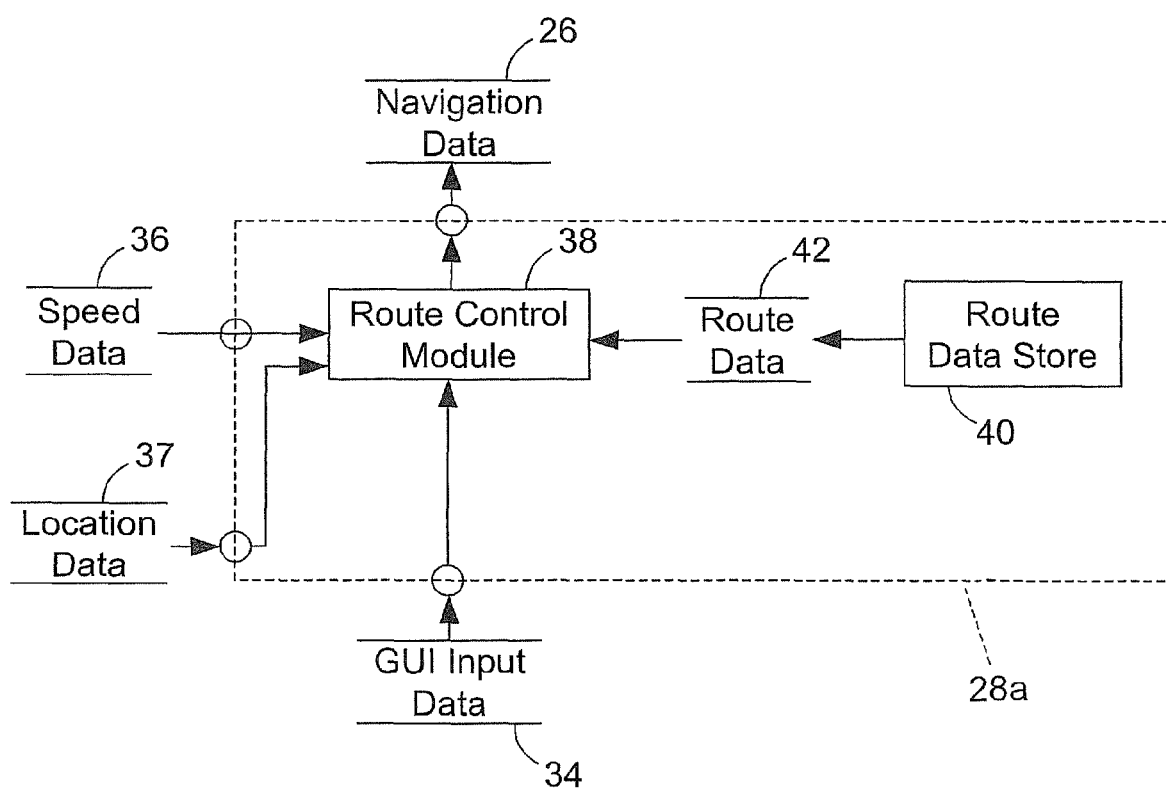
FIG. 3 is a dataflow diagram illustrating an exemplary navigation system of the present disclosure.

With reference to FIG. 3, a dataflow diagram illustrates an exemplary navigation system 28a that may be embedded within the navigation control module 28. The navigation system 28a may include a route control module 38 and a route datastore 40. The route control module 38 receives as input the GUI input data 34, the location data 37, and optionally the speed data 36. The route control module 38 also receives as input route data 42. The route data 42 comprises the most appropriate route for the vessel 10 to take to reach the destination from the origin, as provided by the route datastore 40.

The route datastore 40 may comprise one or more data storage devices and may be at least one of random access memory (RAM), read only memory (ROM), a cache, a stack, or the like which may temporarily or permanently store electronic data. The route datastore 40 stores electronic data associated with the routes for the vessel 10. Thus, in a commercial marine application, the route datastore 40 may comprise electronic data that includes approved shipping routes, while in a commercial aircraft application, the route datastore 40 may comprise aeronautical charts. Based on the GUI input data 34 and location data 37, the route control module 38 queries the route datastore 40 for the most appropriate route for the vessel 10, which is provided as the route data 42. The route control module 38 outputs the received route data 42 as navigation data 26.

With reference to FIG. 2, the navigation data 26 is received by the conditions control module 30 and the GUI manager control module 32. The conditions control module 30 receives as input the navigation data 26. The conditions control module 30 may also receive as input weather condition data 44 and adjacent mobile platform data 46. The weather condition data 44 may comprise forecasted weather conditions that may be received from any suitable source, such as a satellite system or digital weather tracking system (not shown). The adjacent mobile platform data 46 may comprise mobile platforms, such as vessels 10, which are located near the route 26*a* or on the same route 26*a* as the subject vessel 10. Based on the navigation data 26, weather condition data 44 and adjacent mobile platform data 46, the conditions control module 30 sets conditions data 24 for the GUI manager control module 32.

Figure 4:
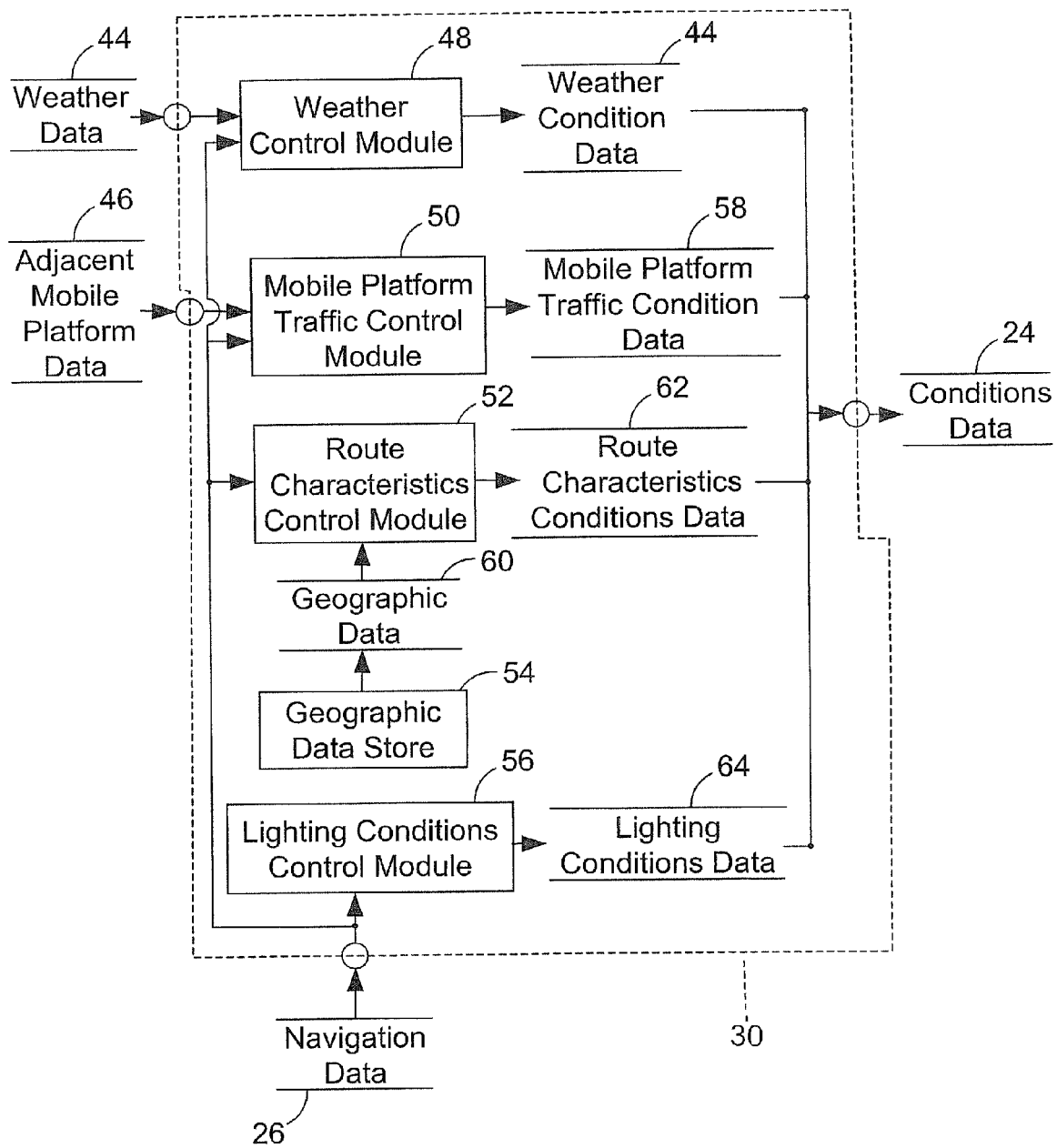
FIG. 4 is a dataflow diagram illustrating an exemplary conditions system of the present disclosure.

In particular, with reference to FIG. 4, a dataflow diagram illustrates an exemplary conditions system that may be embedded within the conditions control module 30. The conditions control module 30 includes a weather control module 48, a mobile platform traffic control module 50, a route characteristics control module 52, a geographic datastore 54 and a lighting conditions control module 56.

The weather control module 48 receives as input the weather condition data 44 and the navigation data 26. Based on the navigation data 26 and the weather condition data 44, the weather control module 48 determines the weather that is forecasted for the route of the vessel 10. The weather control module 48 then sets the weather condition data 44 for the route. The mobile platform traffic control module 50 receives as input the adjacent mobile platform data 46 and the navigation data 26. Based on the navigation data 26 and the adjacent mobile platform data 46, the mobile platform traffic control module 50 determines the mobile platforms, such as vessels 10, which are within a threshold to the route outlined in the navigation data 26. Then, the mobile platform traffic control module 50 sets this data as mobile platform traffic condition data 58.

The route characteristics control module 52 receives as input the navigation data 26 and geographic data 60. The geographic data 60 comprises the geographic characteristics associated with the route provided in the navigation data 26, as provided by the geographic datastore 54. The geographic datastore 54 may comprise one or more data storage devices and may be at least one of random access memory (RAM), read only memory (ROM), a cache, a stack, or the like which may temporarily or permanently store electronic data. In addition, the geographic datastore 54 and route datastore 40 may comprise the same data storage device, if desired. The geographic datastore 54 stores electronic data associated with the geography appropriate for the safe travel of the vessel 10. Thus, in a commercial marine application, the geographic datastore 54 may comprise electronic data that includes geographic data, such as the depths of the water, islands, coral, known icebergs, major cities, capitals, countries, and also information such as safe harbors and the location of navigational markers, etc., for example. In a commercial aircraft application, the geographic datastore 54 may comprise no fly zones, mountain ranges, power lines, etc., for example.

Based on the navigation data 26, the route characteristics control module 52 queries the geographic datastore 54 for the geography associated with the route of the vessel 10, which is provided as the geographic data 60. The route characteristics control module 52 outputs the received geographic data 60 as route characteristics condition data 62.

The lighting conditions control module 56 receives as input the navigation data 26. Based on the navigation data 26, the lighting conditions control module 56 computes the lighting conditions associated with the route of the vessel 10. In this regard, given the route of the vessel 10 and the timeline of travel as entered in the timeline GUI, the lighting conditions control module 56 uses mathematics familiar to celestial navigators, such as that discussed in "The American Practical Navigator: An Epitome of Navigation" by Nathaniel Bowditch, 1995 Edition, for example. The celestial calculations may be performed to yield a time for sunrise/sunset that is accurate to within approximately one minute. Based on the times for sunrise/sunset, and the timeline of travel along the route 26*a* at the given speed of the vessel 10, the lighting conditions control module 56 may compute the lighting conditions for the entire route 26*a*. The lighting conditions for the route 26*a* at a given time may be set as lighting condition data 64, which may comprise data associated with the start of one or more of dawn, dusk, nightfall, day and night along the selected route 26*a*.

The weather condition data 44, mobile platform traffic condition data 58, route characteristics condition data 62 and lighting condition data 64 are output as conditions data 24. For example, with reference to FIG. 1, the conditions data 24 may comprise a weather indicator 24*a*, a mobile platform traffic indicator 24*b*, a route characteristic icon 24*c*, a lighting indicator 24*d* and combinations thereof. The weather indicator 24*a* may comprise a graphical representation of the weather condition data 44, such as a rain storm, calm seas, rough waters, etc. The mobile platform traffic indicator 24*b* may comprise icons indicating adjacent vessels as determined by the mobile platform traffic control module 50. The route characteristic icon 24*c* may comprise a graphical representation of the route characteristics condition data 62, such as illustrations of continents, cities, islands and countries. The lighting indicator 24*d* may comprise a graphical illustration of the lighting condition data 64, such as a shaded region on the GUI 16. In the exemplary illustration of the lighting indicator 24*d* on the GUI 16, the vessel 10 has just passed dawn and local time onboard is early morning.

With reference to FIG. 2, the conditions data 24 is received as input by the GUI manager control module 32. The GUI manager control module 32 outputs or populates the GUI 16 and receives as input user input 18. The GUI 16 is any suitable GUI, and comprises any number of GUIs required to display the navigation data 26 and conditions data 24, as shown in FIG. 1.

With reference back to FIG. 2, the GUI 16 and user input 18 comprise a GUI control panel 66 that creates the GUI 16. The GUI manager control module 32, upon receipt of the conditions data 24 and the navigation data 26, outputs the GUI 16 to display the conditions data 24 and the navigation data 26 on the display system 14. Further, upon receipt of the user input 18, provided through the user input device, the GUI manager control module 32 sets GUI input data 34 for the navigation control module 28 and the conditions control module 30. The user input 18, as discussed, comprises an origin and/or a destination associated with the navigation of the vessel 10, a timeline associated with the travel of the vessel 10 from the origin to the destination and a speed of the vessel 10, however, the user input 18 may comprise any combination of data associated with the navigation of the vessel 10. For example, the user input 18 may comprise a destination, and a desired speed of travel for the vessel 10, and the navigation control module 28 could acquire the location and/or origin of the vessel 10 from a secondary control module, such as a global positioning system associated with the vessel 10.

Figure 5:
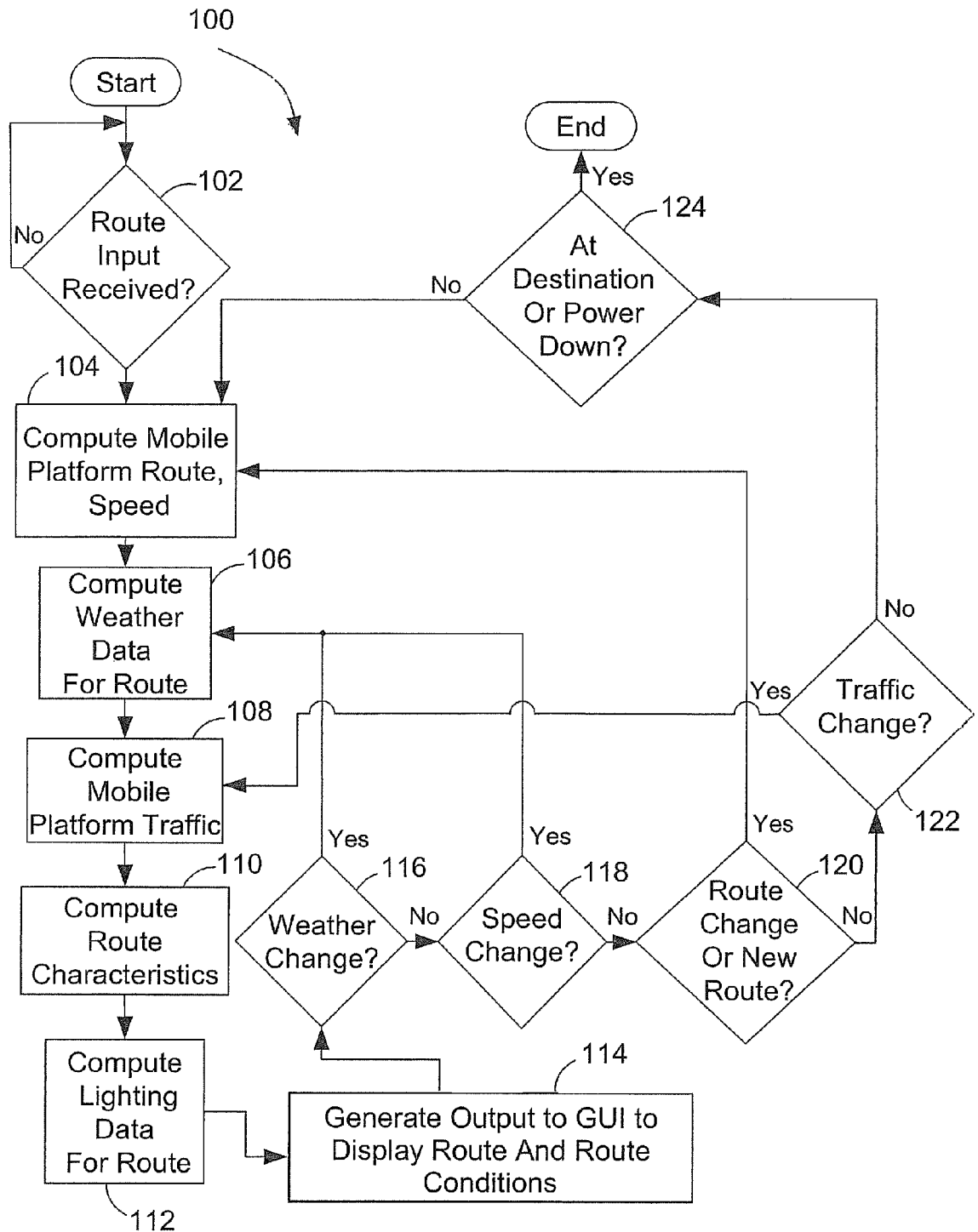
FIG. 5 is a flowchart illustrating an operational sequence for generating the simulation of FIG. 1.

With reference to FIG. 5, a process flow diagram illustrates an exemplary operational sequence 100 performed by the route conditions control module 20. At operation 102, the method determines if navigation data, such as the origin, destination, timeline and/or speed, was received. If no route data was received, then the method loops until route data is received. The route data can be received through the user input 18 to the GUI 16. Once the navigation data is received at operation 104, the method determines the navigation data 26 for the mobile platform, such as the speed data 36 and current location data 37. At operation 106, the method gathers the weather condition data 44 for the route 26a. Then, at operation 108, the method determines the mobile platform traffic condition data 58. At operation 110, the method determines the route characteristics condition data 62. Then, in operation 112, the method computes the lighting condition data 64 for the route 26a. In operation 114, the method generates an output to the GUI 16 to display the navigation data 26 and the conditions data 24.

Next, in operation 116, the method determines if the weather condition data 44 has changed. If the weather condition data 44 has changed, then the method goes to operation 106. Otherwise, the method goes to operation 118. At operation 118, the method determines if the speed data 36 associated with the vessel 10 has changed. If the speed data 36 associated with the vessel 10 has not changed, then the method goes to operation 120. If the speed data 36 associated with the vessel 10 has changed, then the method goes to operation 106.

At operation 120, the method determines if the route 26a has changed or if there is a new route 26a. If the route 26a has changed, then the method goes back to operation 104. If the route 26a has not changed, then, at operation 122, the method determines if the mobile platform traffic condition data 58 has changed. If the mobile platform traffic condition data 58 has changed, then the method goes to operation 108. Otherwise, the method goes to operation 124. At operation 124, the method determines if the vessel 10 is at the destination or if there is a power down request. If a power down request is received or the vessel 10 has reached the destination, then the method ends. Otherwise, the method goes back to operation 104 to enable the continuous updating of the navigation data 26 and conditions data 24 displayed on the GUI 16.

Thus, the route conditions control module 20 may provide a user with an intuitive view of the route 26a the vessel 10 is traveling along with any conditions that exist near or adjacent to the route 26a. The route conditions control module 20 of the present disclosure improves situation awareness of the route 26a and conditions along the route 26a of the vessel 10 to facilitate changes or corrections to the route 26a to maximize efficiency of a planned route 26a. This improves the decision making capabilities of the navigator during the course of evaluating various route 26a plans and navigation parameters. Further, the route conditions control module 20 provides lighting conditions day/night depiction that may move according to the estimated time and location of the vessel 10. In coordination with the weather condition data 44, and the ability to select a particular time period to evaluate, allows the navigator to evaluate single or multiple routes that may be compared or overlayed with multiple route scenarios.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for simulating conditions along a route traveled by a mobile platform comprising:
   a source of user input;
   a navigation control module that generates navigation data that includes at least a continuous subportion of a route for the mobile platform based upon at least the user input;
   a conditions control module that determines at least one condition associated with the at least continuous subportion of the route, the at least one condition including at least a lighting condition associated with the travel of the mobile platform along the at least continuous subportion of the route;
   a graphical user interface (GUI) manager module that populates a graphical user interface (GUI) to display the at least continuous subportion of the route and the at least one condition associated with the at least continuous subportion of the route, and that receives the user input; and
   wherein the at least continuous subportion of the route displayed on the GUI is an aerial, overhead view of the at least continuous subportion of the route along with the at least one condition superimposed on the aerial overhead view at one or more locations along the at least continuous subportion of the route.

2. The system of claim 1, wherein the at least one condition is selected from the group comprising a weather condition, a mobile platform traffic condition, a route characteristic condition, the lighting condition and combinations thereof.

3. The system of claim 2, wherein the conditions control module further comprises:
   a source of weather data; and
   a weather control module that determines the weather condition associated with the at least a continuous subportion of the route based on the weather data.

4. The system of claim 2, wherein the conditions control module further comprises:
   a source of adjacent mobile platform data; and
   a mobile platform control module that determines, based on the adjacent mobile platform data, the mobile platform traffic condition associated with the at least continuous subportion of the route.

5. The system of claim 2, wherein the conditions control module further comprises:
   a geographic datastore that stores geographic data;
   a route characteristics control module that generates, based on the at least continuous subportion of the route, the geographic data associated with the at least continuous subportion of the route; and
   wherein the geographic data associated with the at least continuous subportion of the route is the route characteristics condition.

6. The system of claim 2, wherein the conditions control module further comprises:
   a lighting conditions control module that computes the lighting condition along the at least continuous subportion of the route based on the navigation data, the lighting condition including at least one of day lighting condition and night lighting condition that occurs as the mobile platform travels along the at least continuous subportion of the route.

7. The system of claim 6, wherein the night lighting condition that occurs along the at least continuous subportion of the route is represented as shading on the GUI, and the day lighting condition is represented by no shading on the GUI.

8. The system of claim 6, wherein the navigation control module further comprises:
a source of speed data for the mobile platform;
a source of location data regarding a current position of the mobile platform;
a route datastore that stores route data, the route data including routes for the mobile platform to travel throughout the world;
a route control module that determines the navigation data for the mobile platform, the navigation data including the route received from the route datastore based on the user input and the location of the mobile platform, a location of the mobile platform and a timeline to travel the route based on the speed; and
wherein the lighting condition is generated based on the speed and the location of the mobile platform, the lighting condition corresponding to the timeline.

9. A method of controlling a display of route conditions to assist in the navigation of a mobile platform comprising:
receiving at least one user input that provides at least a destination for the mobile platform;
computing at least a continuous subportion of a route for the mobile platform based on a location of the mobile platform and the destination;
computing at least one condition along the at least continuous subportion of the route, the condition including at least one lighting condition along the at least continuous subportion of the route; and
generating an aerial overhead visual display that displays the at least continuous subportion of the route from an aerial, overhead perspective, the aerial overhead visual display of the at least continuous subportion of the route including the location of the mobile platform and the at least one lighting condition along the at least continuous subportion of the route.

10. The method of claim 9, wherein computing the at least one condition further comprises:
computing weather data for the at least continuous subportion of the route; and
displaying the weather data on the display.

11. The method of claim 9, wherein computing the at least one condition further comprises:
computing mobile platform traffic adjacent to the at least continuous subportion of the route; and
displaying the mobile platform traffic on the display.

12. The method of claim 9, wherein computing the at least one condition further comprises:
computing characteristics of the at least continuous subportion of the route, the route characteristics including at least one of landmark associated with travel along the at least continuous subportion of the route; and
displaying the characteristics on the display.

13. The method of claim 9, further comprising:
computing a speed of the mobile platform;
determining if the at least one condition, the speed or the at least continuous subportion of the route has changed; and
re-computing the at least one condition or the at least continuous subportion of the route based on the changed at least one condition, the changed speed or a change of the at least continuous subportion of the route.

14. A marine vessel comprising:
a pilot house;
a display located within the pilot house, the display controlled by a route conditions control system, the route conditions control system including:
a graphical user interface (GUI) manager module that populates a graphical user interface (GUI) and that receives the user input;
a navigation control module that generates navigation data that includes at least a continuous subportion of a route for the marine vessel based on at least the user input;
a conditions control module that determines at least one condition associated with the at least continuous subportion of the route, the at least one condition including at least a lighting condition associated with the travel of the marine vessel along the at least continuous subportion of the route; and
the GUI displays the route and the at least one condition associated with the at least continuous subportion of the route in an aerial, overhead view with the at least one condition superimposed on the at least continuous subportion of the route at least at one location along the at least continuous subportion of the route.

15. The marine vessel of claim 14, wherein the at least one condition is selected from the group comprising a weather condition, a mobile platform traffic condition, a route characteristic condition, the lighting condition and combinations thereof.

16. The marine vessel of claim 15, further comprising:
a source of weather data;
a source of adjacent mobile platform data;
a weather control module that determines the weather condition associated with the at least continuous subportion of the route based on the weather data;
a mobile platform control module that determines, based on the adjacent mobile platform data, the mobile platform traffic condition associated with the at least continuous subportion of the route;
a geographic datastore that stores geographic data;
a route characteristics control module that generates, based on the at least continuous subportion of the route, the geographic data associated with the at least continuous subportion of the route; and
wherein the geographic data associated with the at least continuous subportion of the route is the route characteristic condition.

17. The marine vessel of claim 15, further comprising:
a lighting conditions control module that computes the lighting condition along the at least continuous subportion of the route based on the navigation data, the lighting condition including at least one of day lighting condition and night lighting condition that occurs as the mobile platform travels along the at least continuous subportion of the route.

18. The marine vessel of claim 15, wherein the night lighting condition that occurs along the at least continuous subportion of the route is represented as shading on the GUI, and the day lighting condition is represented by no shading on the GUI.

19. The marine vessel of claim 18, wherein the navigation control module further comprises:
a source of speed data for the mobile platform;
a source of location data regarding a current position of the mobile platform;

a route datastore that stores route data, the route data including routes for the mobile platform to travel throughout the world;

a route control module that determines the navigation data for the mobile platform, the navigation data including the route received from the route datastore based on the user input and the location of the mobile platform, a location of the mobile platform and a timeline to travel the route based on the speed; and wherein the lighting condition is generated based on the speed and the location of the mobile platform, the lighting condition corresponding to the timeline.

* * * * *